US012226790B2

(12) United States Patent
Patil et al.

(10) Patent No.: US 12,226,790 B2
(45) Date of Patent: Feb. 18, 2025

(54) ACOUSTIC FORCE ASSISTED PAINTING SYSTEM

(71) Applicant: Nissan North America, Inc., Franklin, TN (US)

(72) Inventors: Sandeep Patil, Farmington Hills, MI (US); Nanzhu Zhao, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 274 days.

(21) Appl. No.: 17/334,584

(22) Filed: May 28, 2021

(65) Prior Publication Data

US 2022/0379333 A1 Dec. 1, 2022

(51) Int. Cl.
*B05B 17/06* (2006.01)
*B05B 12/18* (2018.01)

(52) U.S. Cl.
CPC .......... *B05B 17/0607* (2013.01); *B05B 12/18* (2018.02)

(58) Field of Classification Search
CPC ..... B05B 12/18; B05B 17/0607; B05B 5/025; B05B 1/14; B05B 17/06; B05B 17/0615; B05B 17/063; B05B 17/0638; B05B 17/0646; B05B 3/00; B05B 12/16; B05B 5/1608
See application file for complete search history.

(56) References Cited

U.S. PATENT DOCUMENTS

| | | | | |
|---|---|---|---|---|
| 8,501,055 B2 * | 8/2013 | Ohtani | B05B 17/0646 | 264/9 |
| 8,539,840 B2 | 9/2013 | Ariessohn et al. | | |
| 8,758,973 B2 * | 6/2014 | Makabe | B05B 17/0646 | 430/137.1 |
| 2002/0171845 A1 * | 11/2002 | Drake, Jr. | H01L 21/67248 | 374/E11.009 |
| 2003/0107302 A1 * | 6/2003 | Birth | H10N 30/853 | 310/344 |
| 2005/0098101 A1 * | 5/2005 | Shen | B05B 17/063 | 118/313 |
| 2009/0061089 A1 * | 3/2009 | King | B41J 2/04 | 427/255.25 |

FOREIGN PATENT DOCUMENTS

| | | |
|---|---|---|
| WO | 2015110600 A1 | 7/2015 |
| WO | 2018022513 A1 | 2/2018 |

* cited by examiner

*Primary Examiner* — Christopher R Dandridge
(74) *Attorney, Agent, or Firm* — Global IP Counselors, LLP

(57) ABSTRACT

An acoustic force assisted painting system includes a housing, a nozzle, and at least one first transducer. The conduit is configured to receive paint from an external source. The nozzle is disposed in the housing. The nozzle has an inlet that is fluidly connected to the conduit and is configured to receive paint from the conduit. The nozzle has an outlet configured to dispense the paint. The at least one first transducer is disposed in the housing at a location downstream of the nozzle outlet in a flow direction of the paint.

20 Claims, 9 Drawing Sheets

ACOUSTIC FORCE ASSISTED PAINTING SYSTEM

BACKGROUND

Field of the Invention

The present invention generally relates to an acoustic force assisted painting system. More specifically, the present invention relates to an acoustic force assisted painting system for applying paint to a vehicle body.

Background Information

Vehicle paints are typically applied using rotary atomizers that include a rotating bell cup having a generally conical overflow surface that opens to an atomizing edge. The paint that is dispensed from rotary atomizers tends to be tortuous and non-uniform as the atomizing process results in a turbulent path of the paint droplets. Conventional rotary bell atomizers cannot handle high low-shear viscosity paint fluid. Thus, current commercial paint has to contain about 50% solvent, which requires drying through a baking process. Additionally, the atomizing process tends to result in waste and is difficult to utilize for customizations and application of multi-tone paint.

SUMMARY

In view of the state of the known technology, one aspect of the present disclosure is to provide an acoustic force assisted painting system. includes a housing, a nozzle, and at least one first transducer. The conduit is configured to receive paint from an external source. The nozzle is disposed in the housing. The nozzle has an inlet that is fluidly connected to the conduit and is configured to receive paint from the conduit. The nozzle has an outlet configured to dispense the paint. The at least one first transducer is disposed in the housing at a location downstream of the nozzle outlet in a flow direction of the paint.

Another aspect of the present invention is to provide an acoustic force assisted painting system including a housing, at least one nozzle, a paint channel, an acoustic chamber, at least one first transducer, and at least one second transducer. The housing has a conduit for receiving paint from an external source. The at least one nozzle is disposed in the housing. The at least one nozzle has an inlet that is fluidly connected to the conduit to receive paint from the conduit. The at least one nozzle has an outlet that dispenses the paint. The paint channel is disposed in the housing and extends from the nozzle outlet to an outer surface of the housing. The paint channel inlet receives the paint from the nozzle and the paint channel outlet dispenses the paint from the housing. The acoustic chamber is disposed in the housing. The nozzle passes through the acoustic chamber. The at least one first transducer is disposed in the housing at a location downstream of the nozzle outlet in a flow direction of the paint. The at least one second transducer is disposed in the acoustic chamber.

Also other objects, features, aspects and advantages of the disclosed acoustic force assisted painting system will become apparent to those skilled in the art from the following detailed description, which, taken in conjunction with the annexed drawings, discloses exemplary embodiments of the acoustic force assisted painting system.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
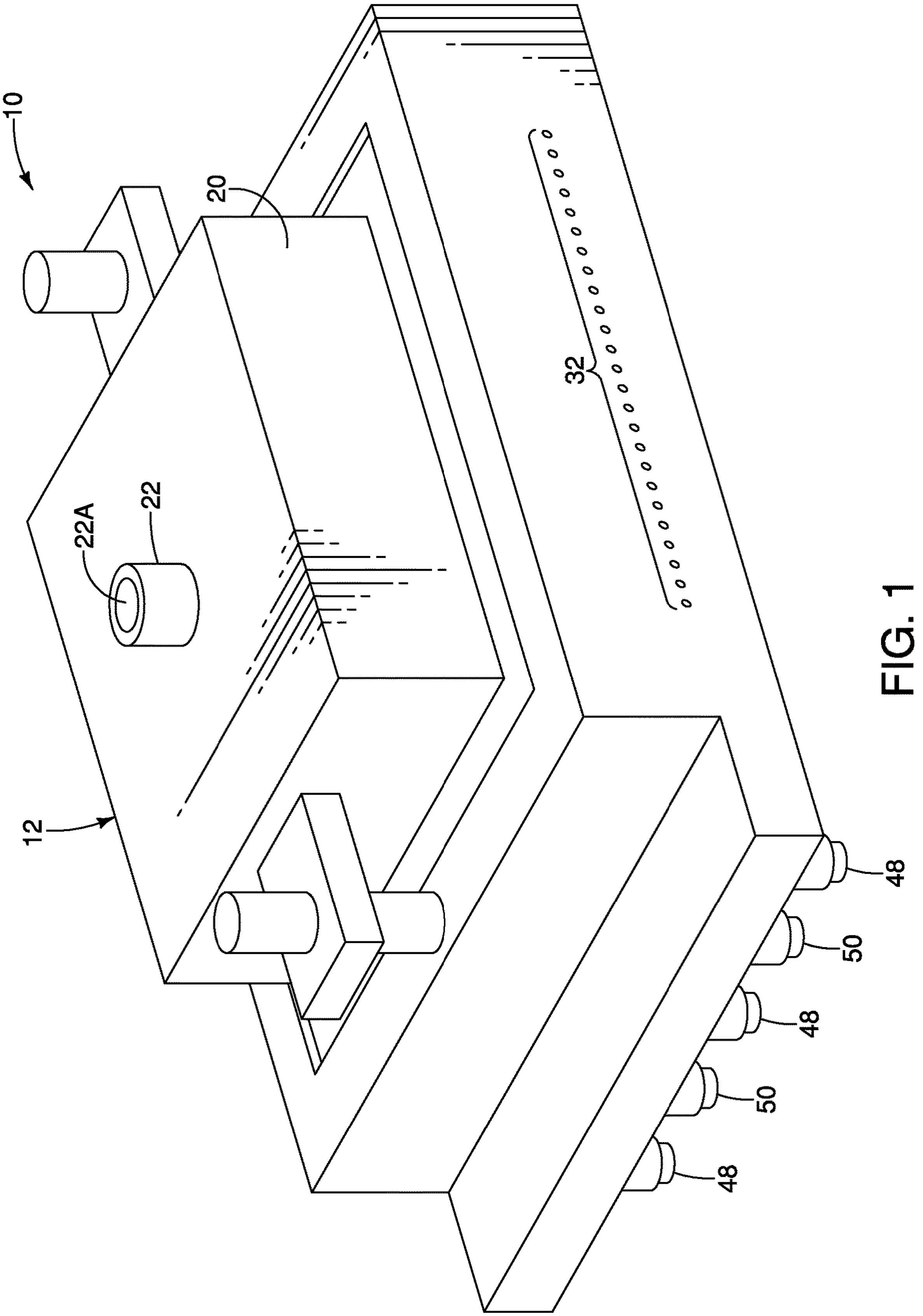
FIG. 1 is a perspective view of a housing for an acoustic force assisted painting system in accordance with an exemplary embodiment of the present invention.
Figure 2:
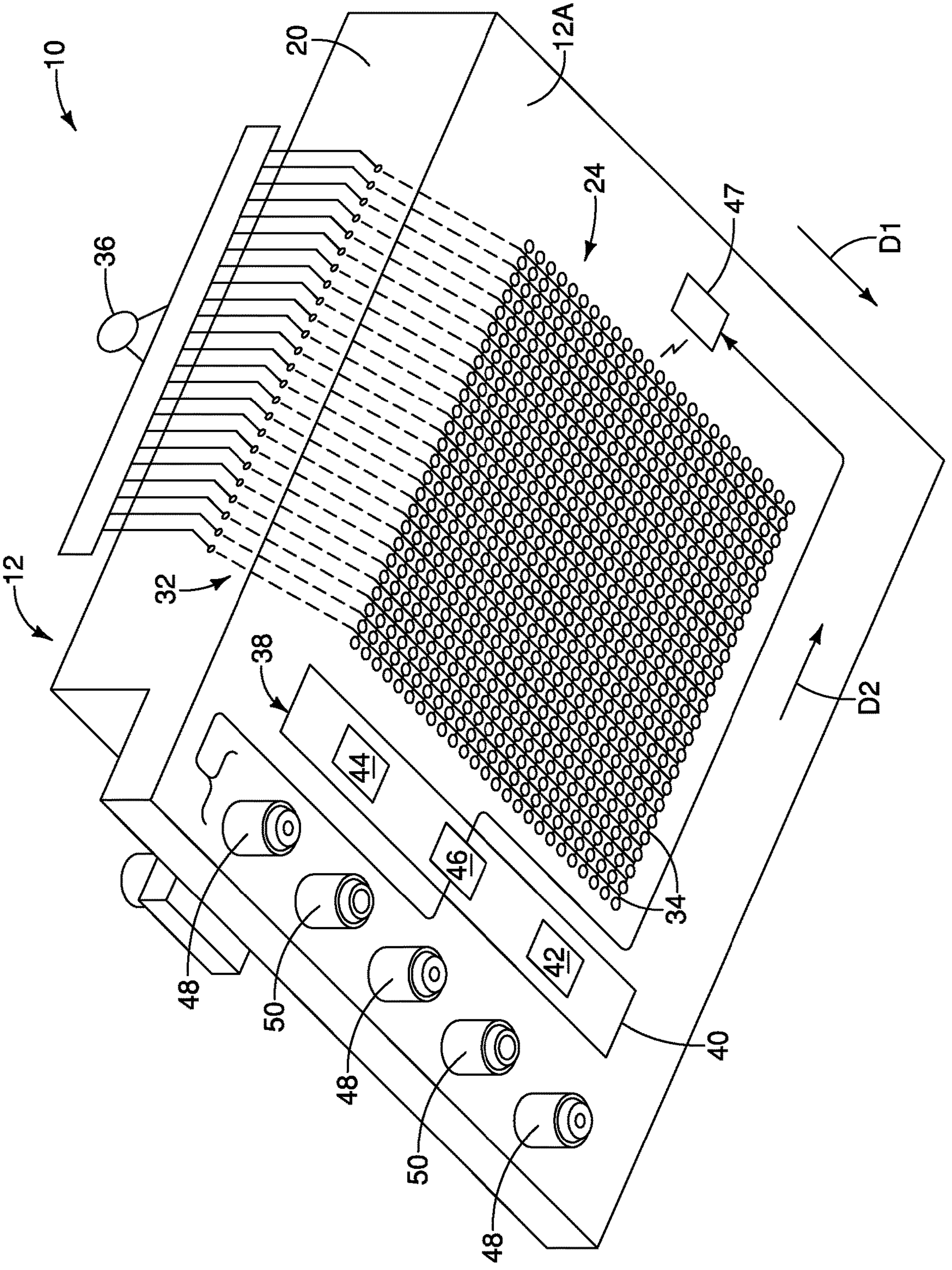
FIG. 2 is a perspective view of the housing of FIG. 1.
Figure 3:
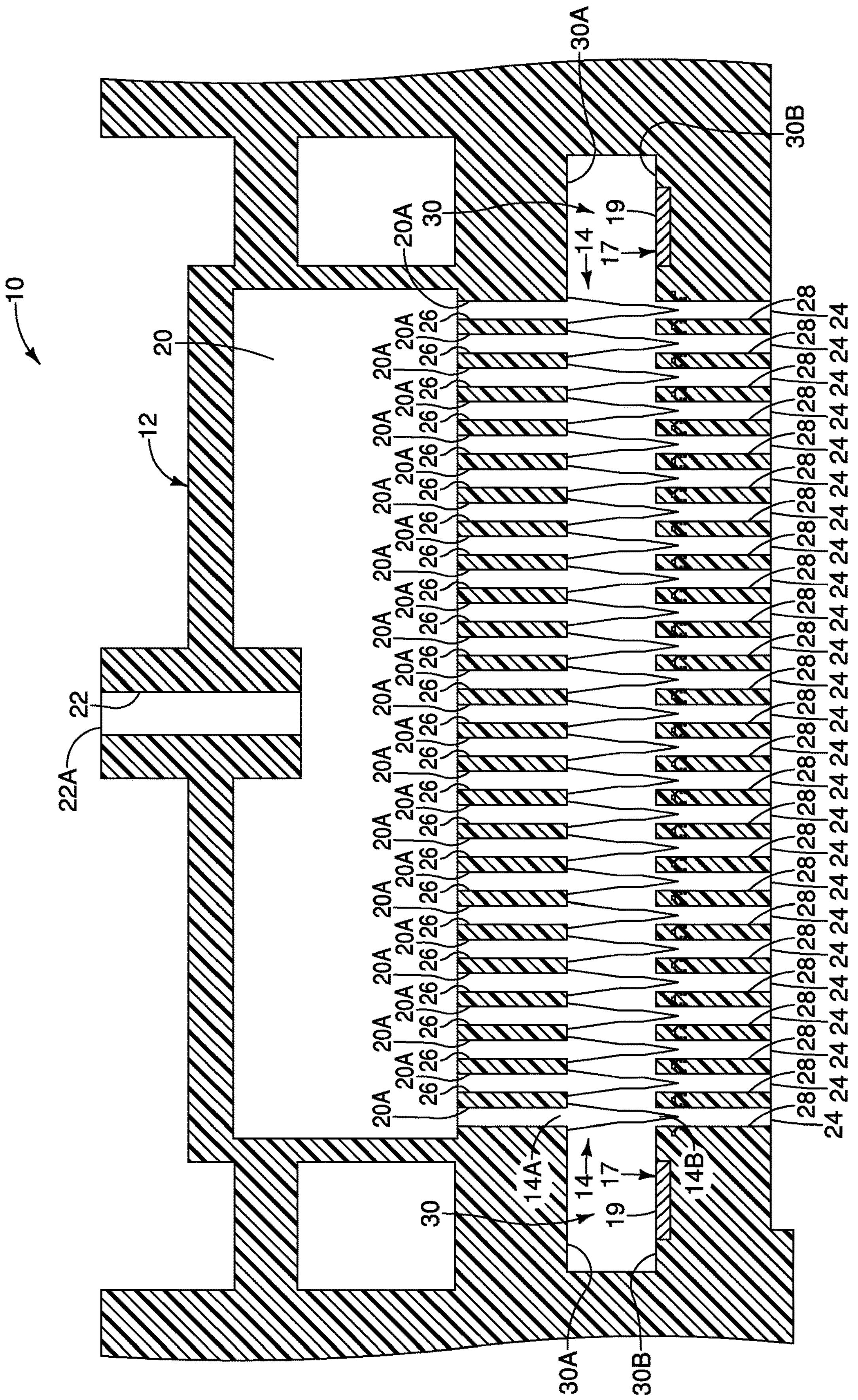
FIG. 3 is a cross-sectional view of the housing of FIGS. 1 and 2.

Referring initially to FIGS. 1 to 3, an acoustic force assisted painting system 10 is illustrated in accordance with an embodiment. The acoustic force assisted painting system 10 of the illustrated exemplary embodiment can be utilized for painting a component, such as a vehicle body. The acoustic force assisted painting system 10 comprises a housing 12, a nozzle 14, and at least one first transducer 16. In the illustrated exemplary embodiment, the housing 12 houses a plurality of nozzles 14 and a plurality of first transducers 16. Each of the first transducers 16 includes a first acoustic transducer 18 that emits acoustic forces. The housing 12 includes a plurality of first acoustic transducers 18. In other words, the acoustic force assisted painting system 10 of FIGS. 1 to 3 includes the plurality of nozzles 14 and the plurality of first transducers 16. The acoustic force assisted painting system 10 is preferably a multi-nozzle 14 system for paint application to a vehicle body.

In the illustrated embodiment, the term “paint” will refer to any material including, but not limited to, one or more of the following substances: traditional paint, ink, polymers, water, solvents, and other fluids imparting color to a substrate and mixtures of the above-mentioned substances. "Paint" can also refer to material(s) having viscosities significantly higher and significantly lower than traditional paint viscosities.

Referring to FIG. 3, the housing 12 includes a reservoir 20 for storing paint. The housing 12 includes a conduit 22 that fluidly receives paint from an external source (not shown) to be stored in the reservoir 20. The conduit 22 fluidly connects the reservoir 20 with the external source to supply paint to the housing 12. The conduit 22 includes an opening that defines an inlet 22A that can be considered an inlet 22A for the housing 12, as shown in FIGS. 1 and 3. While the housing 12 is illustrated as being provided with the reservoir 20 disposed therein, it will be apparent to those skilled in the vehicle field from this disclosure that the housing 12 can be modified such that the conduit 22 connects directly to the nozzles 14. That is, it will be apparent to those skilled in the vehicle field from this disclosure that the housing 12 can be provided without the reservoir 20. Rather, a reservoir can be provided separately from the housing 12 to deliver paint into the housing 12. Therefore, it will be apparent to those skilled in the vehicle field from this disclosure that the acoustic force assisted painting system 10 can include a reservoir that is separately provided externally from the housing 12.

As shown in FIG. 2, the housing 12 includes a plurality of outlets 24 positioned at an underside surface that is opposite side on the housing 12 with respect to the conduit 22. The paint is dispensed from the outlets 24 to be applied to the vehicle body. In the illustrated embodiment, each of the outlets 24 of the housing 12 correspond to one of the nozzles 14. That is, the outlets 24 of the housing 12 receive paint from the nozzles 14 to dispense, as will be further described. While the housing 12 is illustrated as including a single conduit 22 it will be apparent to those skilled in the vehicle field from this disclosure that the housing 12 can include a plurality of conduits 22 for receiving different colors and/or types of paint. Additionally, while the housing 12 is illustrated as including a single reservoir 20 that is fluidly connected to all of the nozzles 14, it will be apparent to those skilled in the vehicle field from this disclosure that the housing 12 can include a plurality of reservoirs 20 for storing different colors and/or types of paint.

As best seen in FIG. 3, the reservoir 20 is a space that receives paint from the conduit 22. The reservoir 20 is preferably a small feedstock reservoir that does not add significant weight to the housing 12. Thus, the reservoir 20 is configured to continuously receive paint from the conduit 22 during use of the acoustic force assisted painting system 10. The reservoir 20 includes a plurality openings 20A that extend into a plurality of supply channels 26. Each of the supply channels 26 extends between the reservoir 20 and the nozzles 14 to fluidly connect the nozzles 14 with the reservoir 20. That is, the supply channels 26 are fluidly connected to the reservoir 20 to receive paint from the reservoir 20. The supply channels 26 are fluidly connected to the nozzles 14 so that paint flows from the reservoir 20 to the nozzles 14.

Figure 4:
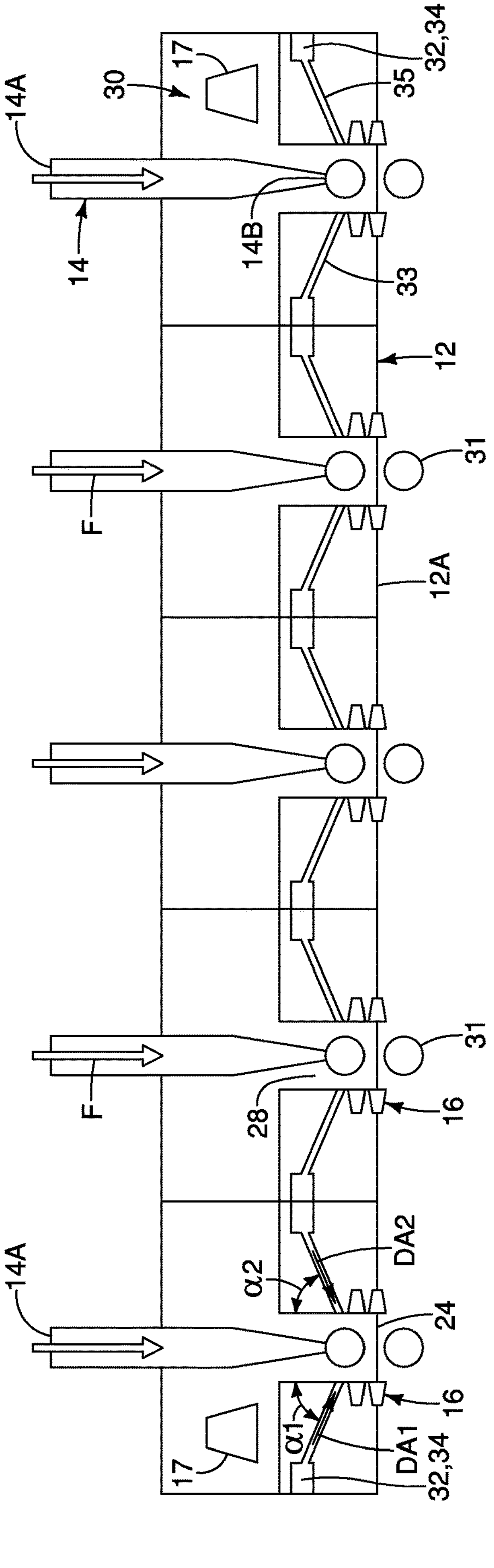
FIG. 4 is an enlarged elevational view of a nozzle and paint channel of the housing of FIG. 3.

The housing 12 further includes a plurality of paint channels 28 that receive paint from the nozzles 14, as shown in FIGS. 2-4. The paint channels 28 include the outlets 24 of the housing 12 that open to the exterior. Therefore, the paint channels 28 are fluidly connected to the nozzles 14 to receive paint from the reservoir 20. The paint channels 28 extend from a nozzle outlet 14B to the outer surface 12A of the housing 12. More particularly, the paint channels 28 extend from the acoustic chamber 30 to the outer surface 12A of the housing 12. The paint channels 28 are configured to receive paint from the nozzles 14. The paint channels 28 are configured to dispense paint from the housing 12 through the housing outlets 24.

The nozzles 14 are fluidly connected to the reservoir 20 and the outlets 24 of the housing 12. That is, the nozzles 14 fluidly connect the reservoir 20 with the outlets 24 of the housing 12 to dispense the paint. As seen in FIGS. 3 and 4, each of the nozzles 14 has an inlet 14A and the outlet 14B. The inlets 14A of the nozzles 14 are fluidly connected to the reservoir 20 via the supply channels 26 to receive paint from the reservoir 20. Each of the outlets 14B of the nozzles 14 dispenses paint into respective ones of the paint channels 28 that lead to the outlets 24 of the housing 12.

The housing 12 further includes an acoustic chamber 30 that houses at least one second transducer 17, as shown in FIGS. 3 and 4. In other words, the at least one second transducer 17 is disposed in the acoustic chamber 30. The acoustic chamber 30 is positioned between the reservoir 20 and the paint channels 28. Therefore, the at least one second transducer 17 is positioned between the reservoir 20 and the paint channels 28. The nozzles 14 extend through the acoustic chamber 30 and are primarily disposed in the acoustic chamber 30 but extend partially into the paint channels 28. In particular, the outlets 14B of the nozzles 14 are disposed in the paint channels 28. The nozzle outlet 14B can be disposed upstream, downstream or substantially adjacent to the first and second airflow channels 33 and 35 in the paint channel 28.

As shown in FIGS. 3 and 4, the housing 12 preferably includes a plurality of the second transducers 17. Each of the second transducers 17 includes a second acoustic transducer 19 that emits acoustic forces. The housing 12 includes a plurality of second acoustic transducers 19.

In the illustrated embodiment, as best shown in FIGS. 2 and 4, the housing 12 includes a first row of second transducers 17 and a second row of second transducers 17 that are disposed on opposite lateral sides of the acoustic chamber 30 with respect to each other. As shown in FIG. 3, the first row of second transducers 17 is disposed on the left side of the acoustic chamber 30 and extends in a direction into and out of the page. The second row of second transducers 17 is disposed on the right side of the acoustic chamber and extends in a direction into and out of the page. However, it will be apparent to those skilled in the vehicle field from this disclosure that the number and arrangement of transducers 18 that can be implemented with the housing 12 can vary. It will also be apparent to those skilled in the vehicle field from this disclosure that the positions of the second transducers 17 within the acoustic chamber 30 can vary.

Conventional vehicle paint has a high viscosity that results in the formation of large-sized paint droplets during application of the paint to the vehicle body. Therefore, the acoustic force assisted painting system 10 of the illustrated embodiment is provided for forming and dispensing uniformly-sized paint droplets 31 from the housing 12 to the vehicle body. The acoustic force assisted painting system 10 is provided to apply continuous pressure of the paint droplets 31 that are dispensed from the housing 12.

In particular, the first and second transducers 16 and 17 of the acoustic force assisted painting system 10 are configured emit acoustic forces (e.g., soundwaves) to increase the velocity and kinetic energy of the paint droplet 31. The increased velocity and kinetic energy of the paint droplet 31 facilitates painting a surface that is oriented in a vertical direction (FIGS. 7 and 8) and facilitates evaporating solvent in the paint droplet 31 to dry the paint droplet 31. The soundwaves emitted by the first and second transducers 16 and 18 also apply pressure to help detach paint bubbles from the outlets 14B of the nozzles 14 to form droplets 31 that can be uniformly and smoothly applied. In the illustrated embodiment, the acoustic force assisted painting system 10 also utilizes electrostatic/magnetic forces, acoustic forces and air flow forces to help detach the droplets from the nozzles 14. In particular, the nozzles 14 are preferably made of a material capable of conducting electrostatic/magnetic forces that will amplify the effect of the acoustic forces generated by the first and second transducers 16 and 17. The housing 12 further includes airflow channels that generate air flow forces that help direct the droplets from the outlets 14B of the nozzles 14 into the paint channels 28, as will be described below.

In the illustrated embodiment, a direction of paint flow F (FIG. 4) flows from the conduit 22, to the reservoir 20, to the supply channels 26, to the nozzles 14, to the paint channels 28, and to the outlets 24. That is, the reservoir 20 is upstream of the nozzles 14 and the nozzles 14 are upstream of the outlets 24. In the illustrated exemplary embodiment, as shown in FIG. 3, the acoustic chamber 30 is disposed downstream of the reservoir 20 and upstream of the outlets 24 of the housing 12. The acoustic chamber 30 is upstream of the outlets 14B of the nozzles 14. That is, the first transducers 16 are preferably downstream of the outlets 14B of the nozzles 14 in the flow direction of the paint, and the second transducers 17 are preferably upstream of the outlets 14B of the nozzles 14 and downstream of the inlets 14A of the nozzles 14 in the flow direction of the paint.

As best seen in FIGS. 1, 2 and 4, the housing 12 includes a first air supply channel 32 and a second air supply channel 34. The first air supply channel 32 extends through the paint channels 28 in a first air supply direction D1 to enable external air to flow through the paint channels 28 in the first air supply direction D1, as best shown in FIG. 2. The second air supply channel 34 extends through the second channels 28 in a second air supply direction D2 that is transverse to the first direction D1 to enable external air to flow in the second air supply direction D2. The first and second air supply channels 32 and 34 are arranged and configured to generate air flow forces to help detach the droplets from the outlets 14B of the nozzles 14. In particular, air flow forces can be directed towards the droplets 31. The supplied air can enter the paint channels 28 substantially tangentially from the first air supply channel 32 to create a swirling moment at the droplets that have detached from the nozzle outlets 14B.

As shown in FIG. 4, the first and second air supply channels 32 and 34 supply air to first and second airflow channels 33 and 35. The first airflow channel 33 is configured to emit air into the paint channel 28 in a first direction DA1. The second airflow channel 35 is configured to emit air into the paint channel 28 in a second direction DA2. The first and second airflow channels 33 and 35 are disposed at angles $\alpha 1$ and $\alpha 2$ to the paint channel 28. As shown in FIG. 4, the angles $\alpha 1$ and $\alpha 2$ are preferably less than 90 degrees. The angles $\alpha 1$ and $\alpha 2$ are preferably substantially equal. The nozzle outlet 14B is preferably disposed downstream of the first and second airflow channels 33 and 35.

The first air supply channel 32 opens to the exterior of the housing 12, as shown in FIGS. 1 and 2. As best shown in FIG. 2, the acoustic force assisted painting system 10 further includes an external airflow source, such as an air pump 36. The air pump 36 is in direct communication with the first air supply channel 32 to pump air from the exterior of the housing 12 into the first air supply channel 32. The first and second air supply channels 32 and 34 are in communication with each other such that air flows from the first air supply channel 32 to the second air supply channel 34.

The second air supply channels 34 intersect with the paint channels 28 of the housing 12 to enable airflow from the second air supply channels 34 to the paint channels 28. The second air supply channels 34 intersect with the paint channels 28 at a location in the vicinity of the outlets 14B of the nozzles 14 so that air from the second air supply channels 34 is applied to the droplets 31 dispensed from the outlets 14B of the nozzles 14.

In the illustrated exemplary embodiment, air flow forces flow from the air pump 36, to the first air supply channels 32, to the second air supply channels 34, to the paint channels 28. In this way, air is pumped from the exterior to the paint channels 28 to apply airflow forces that will help push the droplets 31 that have detached from the nozzle outlets 14B downward into the paint channels 28. Therefore, the air flows through the first and second air supply channels 32 and 34 to apply airflow force to the nozzles 14.

Referring to FIGS. 2 and 3, the nozzles 14 are arranged in an array of successive rows and columns within the housing 12. The nozzles 14 can be made of any conducting material that can conduct electricity. Preferably, the nozzles 14 are metallic tubes. Each of the nozzles 14 preferably has the same size and dimension with respect to each other to ensure uniformity of the droplets that are formed. Preferably, the outlets 14B of the nozzles 14 have a size between 1 micron to 500 microns (μm). The droplets formed at the outlets 14B of the nozzles 14 preferably have a size between 1 in to 500 μm.

It will be apparent to those skilled in the vehicle field from this disclosure that the sizes of the nozzles 14 can vary depending on the intensity of the acoustic forces that are applied to the droplets from the first and second transducers 16 and 17. Therefore, the sizes of the nozzles 14 can vary depending on the distance between the nozzles 14 and the first and second transducers 16 and 17 and/or the frequency of the soundwaves that are emitted by the first and second transducers 16 and 17. Therefore, it will be apparent to those skilled in the vehicle field from this disclosure that the outlets 14B of the nozzles 14 can be larger when the first and second transducers 16 and 17 are closer or when the first and second transducers 16 and 17 emit a higher frequency. It will also be apparent to those skilled in the vehicle field from this disclosure that the outlets 14B of the nozzles 14 can be smaller when the first and second transducers 16 and 17 are farther away or when the first and second transducers 16 and 17 emit a lower frequency. That is, it will also be apparent to those skilled in the vehicle field from this disclosure that the first and second transducers 16 and 17 can emit different frequencies depending on the size of the housing 12 and/or the acoustic chamber 30. That is, the first and second transducers 16 and 17 can emit higher frequencies when the acoustic chamber 30 is larger and the nozzles 14 are more spaced apart.

As stated, the nozzles 14 extend through the acoustic chamber 30. As best shown in FIGS. 3 and 4, the acoustic chamber 30 includes an upstream sidewall 30A and a downstream side wall 30B. The downstream side wall 30B of the acoustic chamber 30 includes the second transducers 17 disposed thereon. That is, the second transducers 17 are positioned on the downstream side wall 30B. In particular, the second transducers 17 are disposed in the housing 12 at a location downstream of the inlet 14A of the nozzles 14 with respect to the reservoir 20. The second transducers 17 are positioned closer to the nozzle outlets 14B than to the inlets 14A of the nozzles 14. The second transducers 18 are positioned upstream of the outlets 14B at a location within the vicinity of the outlets 14B of the nozzles 14.

Thus, the downstream side wall 30B is positioned closer to respective outlets 14B of the nozzles 14 than to the respective inlets 14A. The downstream side wall 30B of the acoustic chamber 30 includes a plurality of openings. Each of the openings receives one of the outlets 14B of the nozzles 14 therethrough. The openings extend into the paint channels 28 that form the outlets 24 of the housing 12. Similarly to the nozzles 14, the second transducers 17 are arranged in successive rows along the acoustic chamber 30. Each of the second transducers 17 corresponds to one of the successive rows of the nozzles 14.

As shown in FIG. 4, the at least one first transducer 16 is disposed in the housing 12 at a location downstream of the nozzle outlet 14B in a flow direction of the paint. The first transducers 16 are disposed in the housing 12 and are oriented to emit acoustic forces into the paint channel 28. As shown in FIG. 4, two pairs of first transducers 16 are diametrically opposed with respect to the paint channel 28 and disposed adjacent the housing outlet 24. In other words, the at least one first transducer 16 is disposed adjacent the housing outlet 24. The at least one first transducer 16 is configured to emit the acoustic force, or wave, in a direction substantially perpendicular to the flow direction of the paint, as shown in FIG. 4. The first transducer 16 can be an electromagnet, electrostatic or piezoelectric transducer to emit electromagnetic waves or sound waves to provide acceleration to the paint droplet 31 to increase the range of the paint droplet 31.

The first and second transducers 16 and 17 can be plate-like members that are each periodically driven by a piezoelectric transducer that is connected to it. In particular, the first and second transducers 16 and 17 can include an integrated unit (i.e., an oscillator) that comprises the acoustic transducers 18 and 19, the plate-like member and electric connections and the like. Therefore, the first and second transducers 18 can be piezoelectric transducers, such as electroacoustic transducers, that convert electrical charges produced by piezoelectric property of solid materials into mechanical energy.

The first and second transducers 16 and 17 can alternatively be magnetostrictive transducers or electromagnetic acoustic transducers that utilize the magnetostrictive property of a material to convert the energy in a magnetic field into mechanical energy. The first and second transducers 16 and 17 can include any other type of acoustic emitter that can emit the necessary soundwaves. In the illustrated exemplary embodiment, the oscillation frequency emitted by the first and second transducers 16 and 17 are preferably in the range of 20 kiloHertz (kHz) to 1 megaHertz (MHz). More preferably, the oscillation frequency emitted by the first and second transducers 16 and 17 are in the range of 25 kHz to 50 kHz.

Referring to FIG. 2, the acoustic force assisted painting system 10 of the illustrated exemplary embodiment can include a control system 38 programmed to control the components of the housing 12, such as the nozzles 14 and the first and second transducers 16 and 17. In particular, the control system 38 can include an electronic controller 40 for controlling the nozzles 14 and the first and second transducers 16 and 17, either in combination or selectively as will be described below. The electronic controller 40 is preferably a microcomputer that includes one or more processor(s) 42 and one or computer memory device(s) 44.

The memory 44 is any computer storage device or any computer readable medium with the sole exception of a transitory, propagating signal. For example, the memory 44 can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM device, a hard disk, a flash drive, etc. The memory 44 is configured to store settings, programs, data, calculations and/or results of the processor(s) 42.

Referring to FIGS. 3 and 4, the first and second transducers 16 and 17 can include one or more wireless communication device(s) for communicating with the processor 42 of the electronic controller 40. In particular, the first and second transducers 16 and 17 can receive control signals from the electronic controller 40 via a wireless communication device(s) 46 of the electronic controller 40. The first and second transducers 16 and 17 can each be equipped with a wireless communication device individually to receive control signals from the electronic controller 40. Alternatively, the first and second transducers 16 and 17 can be equipped with a single wireless communication device to collectively receive control signals from the electronic controller 40.

The nozzles 14 of the housing 12 can be equipped with a wireless communication device 47 to collectively receive control signals from the electronic controller 40, such as the wireless communication device 47 illustrated schematically in FIG. 2. Alternatively, each of the nozzles 14 can be equipped with a wireless communication device 47. The nozzles 14 can be equipped with a respective wireless communication device 47 for communicating with the electronic controller 40.

The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the wireless communication device can be a one-way wireless communication unit, such as a receiver.

The electronic controller 40 can be programmed to control radiation pressure and/or the acoustic frequency emitted by the first and second transducers 16 and 17. For example, the electronic controller 40 can be programmed to modulate the first and second transducers 16 and 17 to change the oscillation (e.g. frequency, phase and/or amplitude) of the acoustic forces emitted by the first and second transducers 16 and 17. The electronic controller 40 can control the oscillation of the first and second transducers 16 and 17 to modulate acoustic emission upon detection that droplets have formed at the outlets 14B of the nozzles 14 and/or that the droplets have been formed are at a predetermined size.

In view of this, the housing 12 can include one or more detector(s) (not shown) disposed at the nozzles 14 or in the vicinity of the nozzles 14 to detect the presence and size of droplets forming at the outlets 14B of the nozzles 14. The detectors can be any type of sensor as needed and/or appropriate. For example, the detector(s) can utilize thermal imaging or acoustic imaging to measure a size or profile of the droplets. The detectors can be equipped with wireless communication devices to send detection signals to the electronic controller 40.

The memory 44 of the electronic controller 40 can store parameters for the frequencies emitted by the first and second transducers 16 and 17. The memory 44 can be programmed to set these parameters or programmed to pre-store these parameters. For example, the memory 44 can store ranges of modulation frequencies that correspond to detected size(s) of the droplets and/or the distance between the nozzles 14 and the first and second transducers 16 and 17. For example, the electronic controller 40 can be programmed to control the first and second transducers 16 and 17 to emit at a higher frequency when the droplets are detected to be greater than a predetermined size to dislodge the droplets.

The electronic controller 40 can also be programmed to control the first and second transducers 16 and 17 to emit at a higher frequency when detected droplets are farther away so that the emitted frequency is sufficient to dislodge the droplets. Alternatively, the electronic controller 40 can also include a timer such that the electronic controller 40 is programmed to control the first and second transducers 16 and 17 to automatically emit pre-determined oscillation frequencies based on pre-set time periods.

Referring to FIGS. 1 and 2, the acoustic force assisted painting system 10 can further include an inspection system for quality insurance of the paint application. For example, the inspection includes one or more detectors, such as cameras 48, for detecting the paint that is dispensed from the outlets 24 of the housing 12. As shown, the cameras 48 are preferably disposed on a bottom side of the housing 12 in the vicinity of the outlets 24 of the housing 12. The cameras 48 can utilize thermal imaging or acoustic imaging to measure a size or profile of the droplets that are ejected from the outlets 24 of the housing 12. Additionally, as shown in FIG. 2, the cameras 48 are in electronic communication with the electronic controller 40 via wireless communication device (s). The electronic controller 40 can be programmed to measure a thickness or uniformity of the paint that is applied to the vehicle body based on the information detected by the cameras 48.

Additionally, referring to FIG. 2, the acoustic force assisted painting system 10 can further include heaters 50 that are disposed on the housing 12. The heaters 50 can apply ultraviolet heating to the applied paint to dry the paint via curing. Alternatively, the heaters 50 can apply infrared heating to dry the paint that is applied to the vehicle body.

Figure 6:
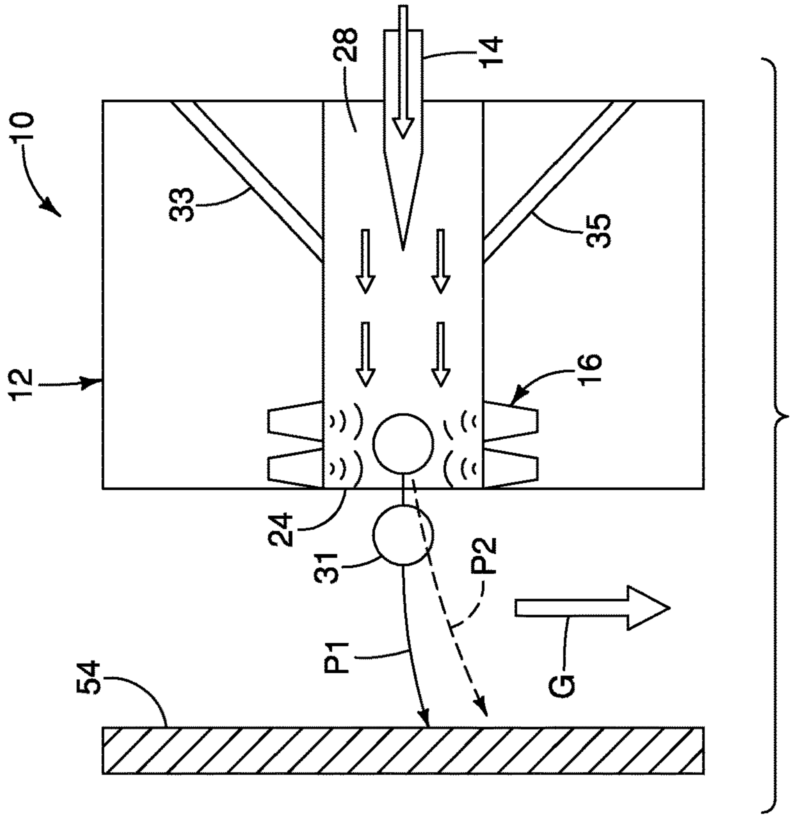
FIG. 6 is an elevational view of the nozzle and paint channel of FIG. 4 during vertical painting.
Figure 5:
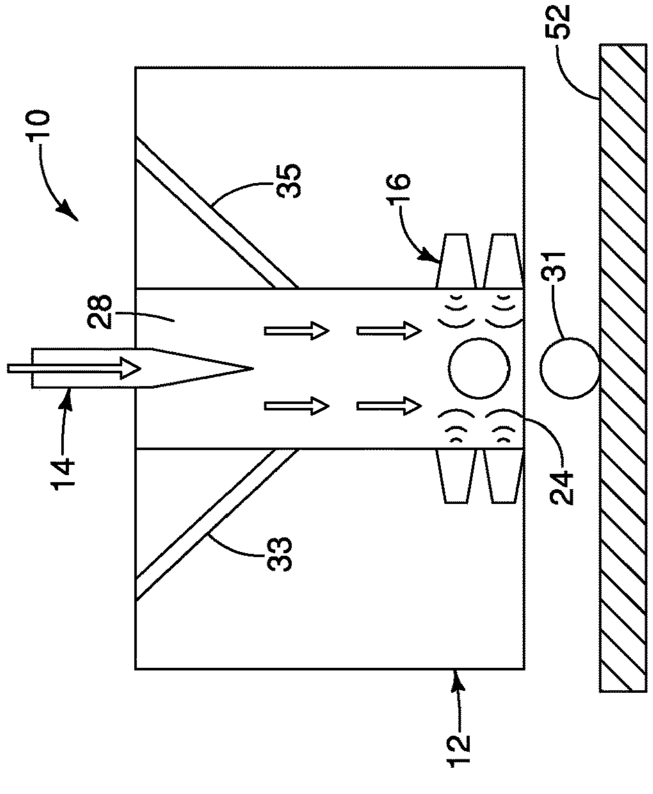
FIG. 5 is an elevational view of the nozzle and paint channel of FIG. 4 during horizontal painting.

The acoustic chamber 30 provides pressure enhancement around the nozzle 14, which facilitates ejecting the paint droplet 31 from the nozzle outlet 14B, as shown in FIG. 4. The acoustic chamber 30 is disposed upstream of the paint nozzle outlet 14B in the paint flow direction F. The at least one first transducer 16 is disposed downstream of the nozzle outlet 14B in the flow direction of the paint, as shown in FIG. 4. The first and second airflow channels 33 and 35 supply air to further facilitate ejecting the paint droplet 31 from the nozzle outlet 14B. The supplied air is preferably heated dry air. The air is preferably heated to between approximately 50 degrees Celsius to approximately 150 degrees Celsius. The supplied air further imparts kinetic energy to the droplet 31 to increase the travel distance of the droplet 31. The temperature and dryness of the supplied air facilitates evaporation of the droplet 31. The at least one first transducer 16 is disposed adjacent the housing outlet 24 to provide additional acceleration to the paint droplet 31 through a phase difference of the emitted transducer waves. The orientation of the at least one first transducer 16 provides acceleration to the paint droplet 31 in a particular direction, which increases the travel distance of the paint droplet 31. The at least one first transducer 16 further facilitates evaporation of the paint droplet 31. The acoustic force assisted painting system 10 improves painting on a horizontally oriented object 52 as shown in FIG. 5 and on a vertically oriented object 54 as shown in FIG. 6. The path of the paint droplet P1 in accordance with the acoustic force assisted painting system 10 of the present invention is less impacted by external forces, such as gravity G (FIG. 6), compared to a path P2 of a paint droplet in accordance with a conventional system.

Figure 7:
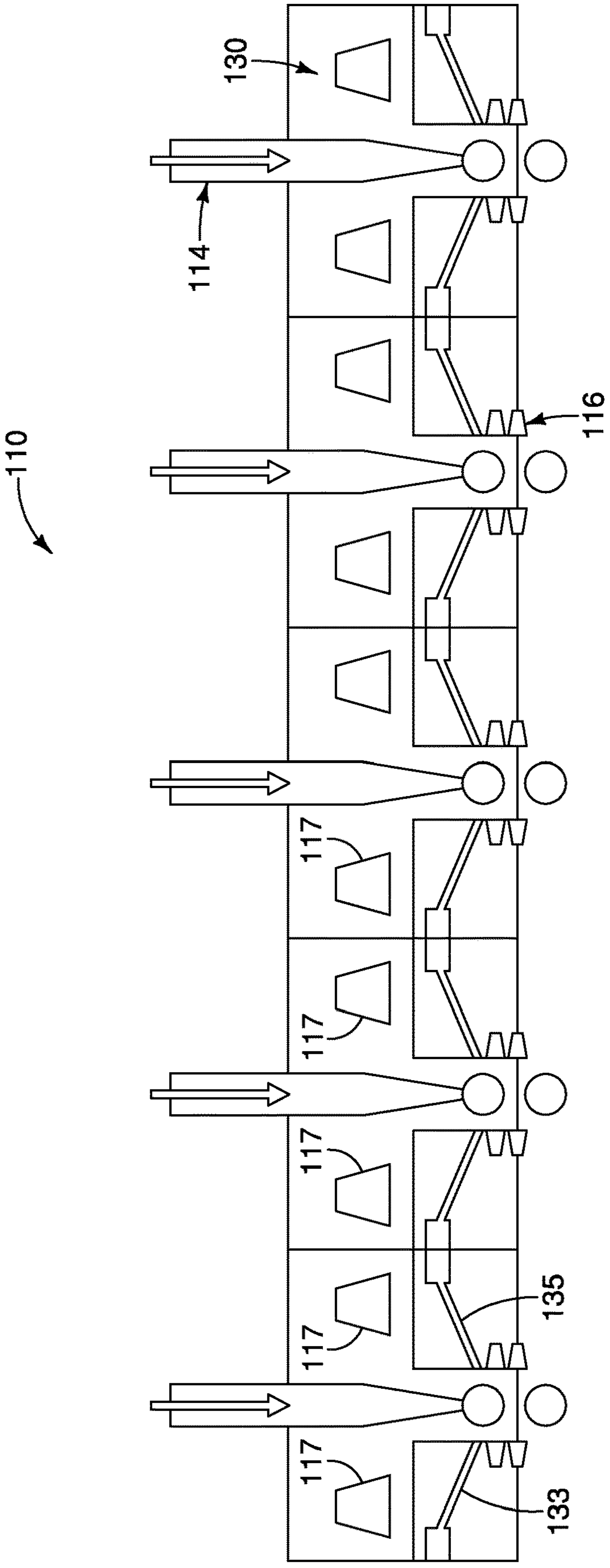
FIG. 7 is an elevational view of the nozzle and paint channel of FIG. 4 in accordance with another exemplary embodiment of the present invention.

As shown in FIG. 7, an acoustic force assisted painting system 110 in accordance with another illustrated exemplary embodiment of the present invention is substantially similar to the acoustic force assisted painting system 10 of the exemplary embodiment illustrated in FIGS. 1 to 4 except for the differences described below. Similar parts are identified with similar reference numerals, except increased by 100 (i.e., 1xx, accordingly).

As shown in FIG. 7, the second transducers 117 are diametrically opposed with respect to each nozzle 14. Referring to FIG. 4, the second transducers 17 are arranged in rows at opposite ends of the acoustic chamber 30. As shown in FIG. 5, the second transducers 117 are arranged in rows in the acoustic chamber 130 on opposite sides of each nozzle 114. The first transducers 116 are oriented substantially similarly to the first transducers 16 shown in FIG. 4. The first and second airflow channels 133 and 135 are oriented substantially similarly to the first and second airflow channels 33 and 35 shown in FIG. 4.

Figure 8:
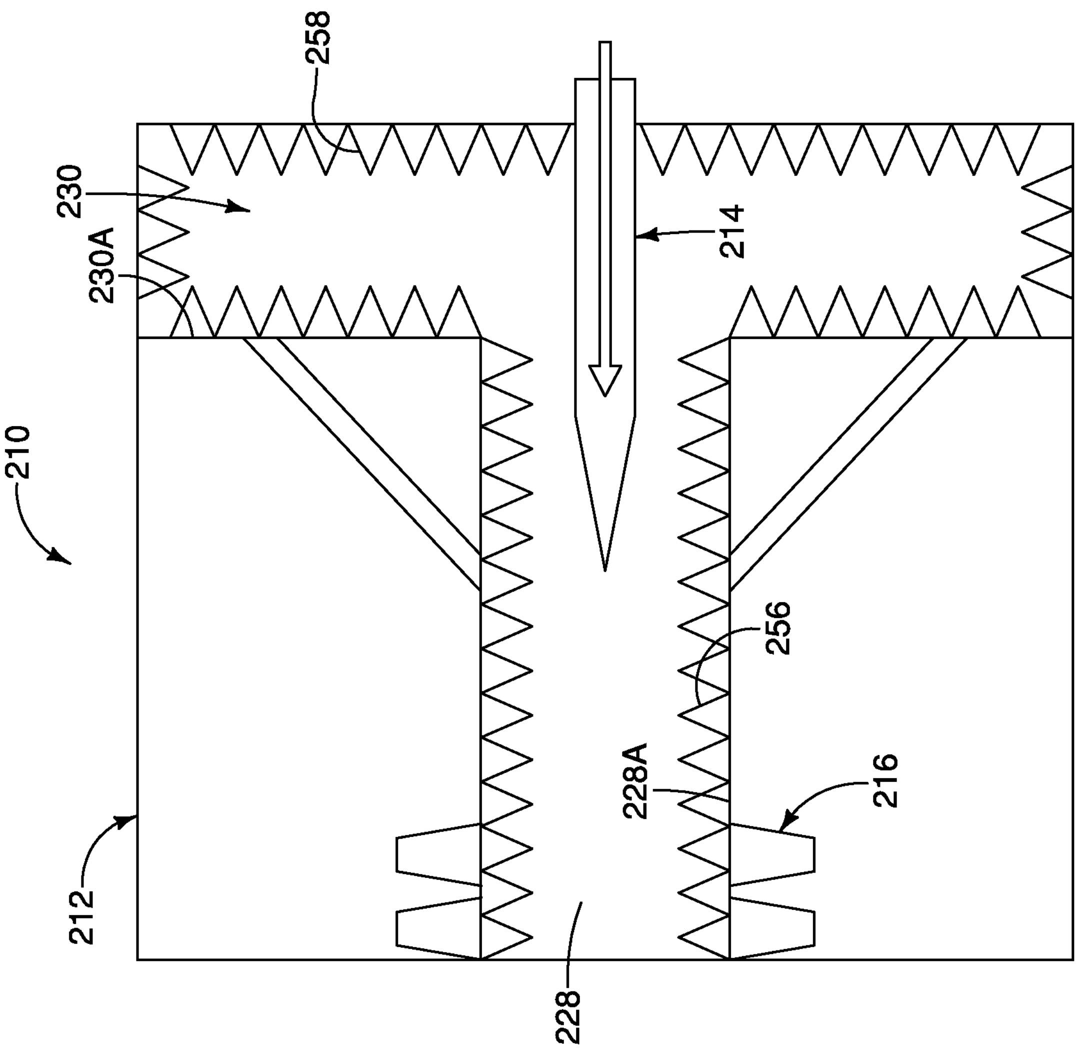
FIG. 8 is an elevational view of the nozzle and paint channel of FIG. 7 in accordance with another exemplary embodiment of the present invention including an anechoic wall structure.
Figure 9:
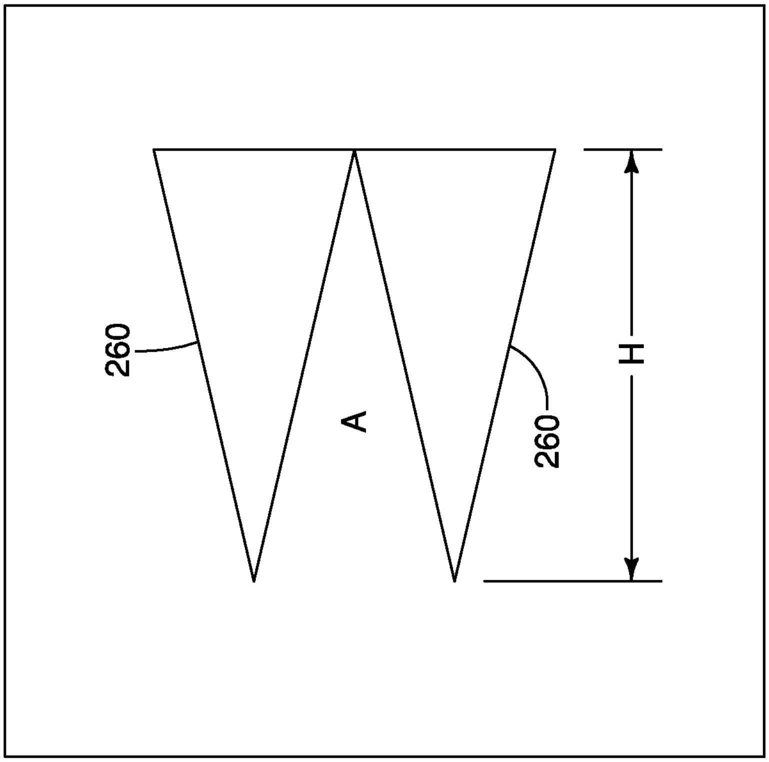
FIG. 9 is an illustration of an exemplary anechoic wall structure of FIG. 8.

As shown in FIGS. 8 and 9, an acoustic force assisted painting system 210 in accordance with another illustrated exemplary embodiment of the present invention is substantially similar to the acoustic force assisted painting systems 10 and 110 of the exemplary embodiment illustrated in FIGS. 1 to 7 except for the differences described below. Similar parts are identified with similar reference numerals, except increased by 200 (i.e., 2xx, accordingly).

As shown in FIG. 8, a first sound absorbent member 256 is disposed on a wall 228A of the paint channel 228. Preferably, a plurality of first sound absorbent members 256 substantially cover an entirety of the wall 228A of the paint channel 228. The paint channel 228 is an anechoic chamber when the walls 228A of the paint channel 228 are lined with the first sound absorbent member 256.

A second sound absorbent member 258 is disposed on a wall 230A of the acoustic chamber 230, as shown in FIG. 8. Preferably, a plurality of second sound absorbent members 258 substantially cover an entirety of the wall 230A of the acoustic chamber 230. The acoustic chamber 230 is an anechoic chamber when the walls 230A of the acoustic chamber 230 are lined with the second sound absorbent member 258.

The first and second sound absorbent members 256 and 258 are preferably a series of wedges 260, as shown in FIG. 9, that line the walls 228A and 230A of the paint channel 228 and the acoustic chamber 230. The wedges 260 have a height H and form a gap of air A between adjacent wedges 260. The first and second sound absorbent members 256 and 258 minimize reflected noise such that sound attenuation and loss of sound energy of the acoustic forces, or waves, emitted by the first and second transducers 116 and 117 is substantially reduced. The first and second sound absorbent members 256 and 258 can be used with any other exemplary embodiment of the present invention.

Figure 10:
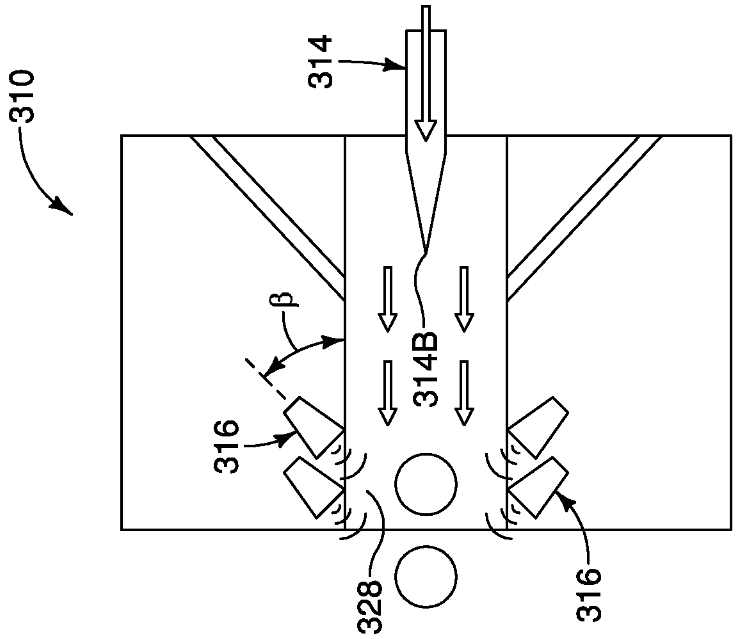
FIG. 10 is an elevational view of the nozzle and paint channel of FIG. 7 in accordance with another exemplary embodiment of the present invention in which a first transducer is oriented at a non-perpendicular angle to a paint flow direction.

As shown in FIG. 10, an acoustic force assisted painting system 310 in accordance with another illustrated exemplary embodiment of the present invention is substantially similar to the acoustic force assisted painting system 10 of the exemplary embodiment illustrated in FIGS. 1 to 6 except for the differences described below. Similar parts are identified with similar reference numerals, except increased by 300 (i.e., 3*xx*, accordingly). Although illustrated as having a substantially triangular shape, the first and second sound absorbent members 256 and 258 can have any suitable shape, such as square, rectangular or sinusoidal.

The first transducers 316 are configured to emit an acoustic force, or wave, in a direction away from the nozzle outlet 314B of the nozzle 314, as shown in FIG. 10. The first transducers 316 can be oriented in any position directed away from the nozzle outlet 314B, such as at an angle β of approximately 45 degrees to the wall 328A of the paint channel 328.

Figure 11:
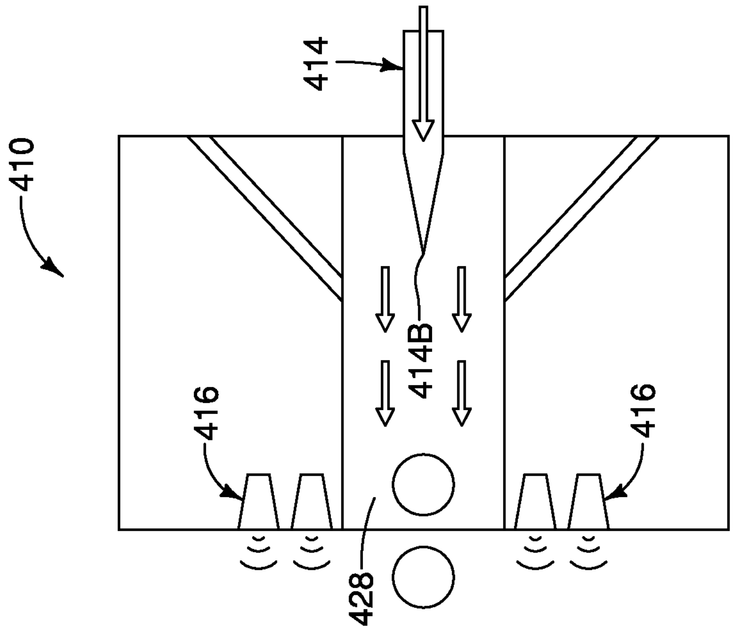
FIG. 11 is an elevational view of the nozzle and paint channel of FIG. 7 in accordance with another exemplary embodiment of the present invention in which a first transducer is oriented substantially parallel to a paint flow direction.

As shown in FIG. 11, an acoustic force assisted painting system 410 in accordance with another illustrated exemplary embodiment of the present invention is substantially similar to the acoustic force assisted painting system 10 of the exemplary embodiment illustrated in FIGS. 1 to 6 except for the differences described below. Similar parts are identified with similar reference numerals, except increased by 400 (i.e., 4xx, accordingly).

The first transducers 416 are configured to emit an acoustic force, or wave, in a direction away from the nozzle outlet 414B of the nozzle 414, as shown in FIG. 11. The first transducers 416 are oriented substantially parallel to the paint flow direction. In other words, the first transducers 416 are configured to emit an acoustic force, or wave, in a direction substantially parallel to the paint flow direction.

Figure 12:
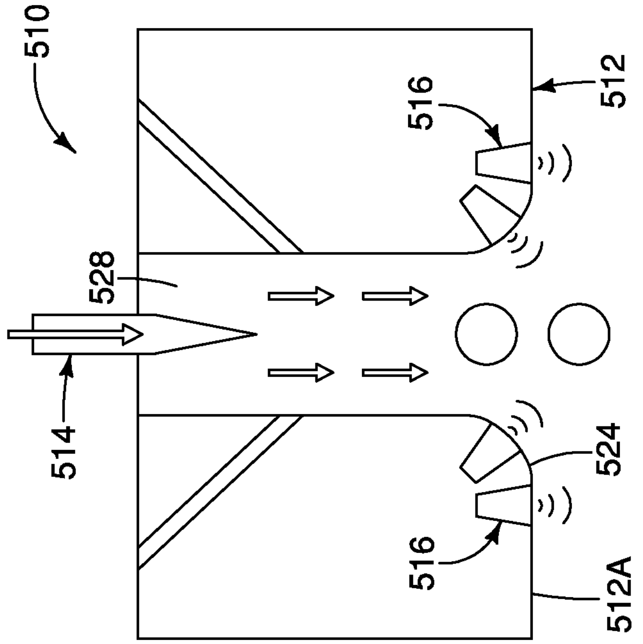
FIG. 12 is an elevational view of the nozzle and paint channel of FIG. 7 in accordance with another exemplary embodiment of the present invention in which a first transducer is disposed on a curved outlet of the paint channel.

As shown in FIG. 12, an acoustic force assisted painting system 510 in accordance with another illustrated exemplary embodiment of the present invention is substantially similar to the acoustic force assisted painting system 10 of the exemplary embodiment illustrated in FIGS. 1 to 6 except for the differences described below. Similar parts are identified with similar reference numerals, except increased by 500 (i.e., 5xx, accordingly).

The first transducers 516 are configured to emit an acoustic force, or wave, in a direction away from the nozzle outlet 514B, as shown in FIG. 12. The housing outlet 524 is curved and the first transducers 516 are arranged on the curved portion of the nozzle outlet 524. First transducers 516 can be disposed adjacent the housing outlet 524 on the outer surface 512A of the housing 512.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An acoustic force assisted painting system comprising:
- a housing having a conduit configured to receive paint from an external source;
- a nozzle disposed in the housing, the nozzle having an inlet that is fluidly connected to the conduit and configured to receive paint from the conduit, the nozzle having only one outlet configured to dispense the paint, a first diameter of the nozzle inlet being larger than a second diameter of the nozzle outlet; and
- at least one first transducer disposed in the housing at a location downstream of the nozzle outlet in a flow direction of the paint, the at least one first transducer being spaced from the nozzle, the at least one first transducer emitting an acoustic force toward the paint dispensed from the nozzle outlet and increasing a velocity and a kinetic energy of the dispensed paint with the emitted acoustic force.

2. The acoustic force assisted painting system according to claim 1, wherein
- a paint channel is disposed in the housing and extends from the nozzle outlet to an outer surface of the housing, the paint channel being configured to receive the paint from the nozzle and to dispense the paint from the housing.

3. The acoustic force assisted painting system according to claim 2, wherein
- the at least one first transducer is disposed adjacent a housing outlet.

4. The acoustic force assisted painting system according to claim 2, wherein
- the at least one first transducer is configured to emit a wave in a direction substantially perpendicular to the flow direction of the paint.

5. The acoustic force assisted painting system according to claim 2, wherein the at least one first transducer is configured to emit a wave in a direction away from the nozzle outlet.

6. The acoustic force assisted painting system according to claim 2, wherein a first airflow channel is configured to emit air into the paint channel in a first direction, and a second airflow channel is configured to emit air into the paint channel in a second direction.

7. The acoustic force assisted painting system according to claim 6, wherein the nozzle outlet is disposed downstream of the first and second airflow channels.

8. The acoustic force assisted painting system according to claim 6, wherein the first and second airflow channels are disposed at an angle to the paint channel.

9. The acoustic force assisted painting system according to claim 8, wherein the angle is less than 90 degrees.

10. The acoustic force assisted painting system according to claim 1, wherein an acoustic chamber is disposed in the housing, the nozzle passing through the acoustic chamber.

11. The acoustic force assisted painting system according to claim 10, wherein at least one second transducer is disposed in the acoustic chamber.

12. The acoustic force assisted painting system according to claim 11, wherein the acoustic chamber is disposed upstream of the nozzle outlet.

13. The acoustic force assisted painting system according to claim 2, wherein a sound absorbent member is disposed on a wall of the paint channel.

14. The acoustic force assisted painting system according to claim 10, wherein a sound absorbent member is disposed on a wall of the acoustic chamber.

15. An acoustic force assisted painting system comprising:

a housing having a conduit for receiving paint from an external source;

at least one nozzle disposed in the housing, the at least one nozzle having an inlet that is fluidly connected to the conduit to receive paint from the conduit, the at least one nozzle having only one outlet that dispenses the paint, a first diameter of the nozzle inlet being larger than a second diameter of the nozzle outlet;

a paint channel disposed in the housing and extending from the nozzle outlet to an outer surface of the housing, the paint channel inlet receiving the paint from the nozzle and the paint channel outlet dispensing the paint from the housing;

an acoustic chamber disposed in the housing, the nozzle passing through the acoustic chamber;

at least one first transducer disposed in the housing at a location downstream of the nozzle outlet in a flow direction of the paint, the at least one first transducer being spaced from the nozzle, the at least one first transducer emitting an acoustic force toward the paint dispensed from the nozzle outlet and increasing a velocity and a kinetic energy of the dispensed paint with the emitted acoustic force; and at least one second transducer disposed in the acoustic chamber.

16. The acoustic force assisted painting system according to claim 15, wherein the paint channel and the acoustic chamber are lined with a sound absorbent member.

17. The acoustic force assisted painting system according to claim 15, wherein a first airflow channel configured to emit air into the paint channel in a first direction, and a second airflow channel configured to emit air into the paint channel in a second direction.

18. The acoustic force assisted painting system according to claim 15, wherein the at least one first transducer is configured to emit a sound wave in a direction substantially perpendicular to the flow direction of the paint.

19. The acoustic force assisted painting system according to claim 15, wherein the at least one first transducer is configured to emit a wave in a direction away from the nozzle outlet.

20. The acoustic force assisted painting system according to claim 19, wherein the at least one first transducer is disposed downstream of the acoustic chamber in the flow direction of the paint.

* * * * *